INVENTORS:
J. RONALD DOZIER
GLENN D. JOHNSON
BY: *John K. Wilkens*
THEIR ATTORNEY

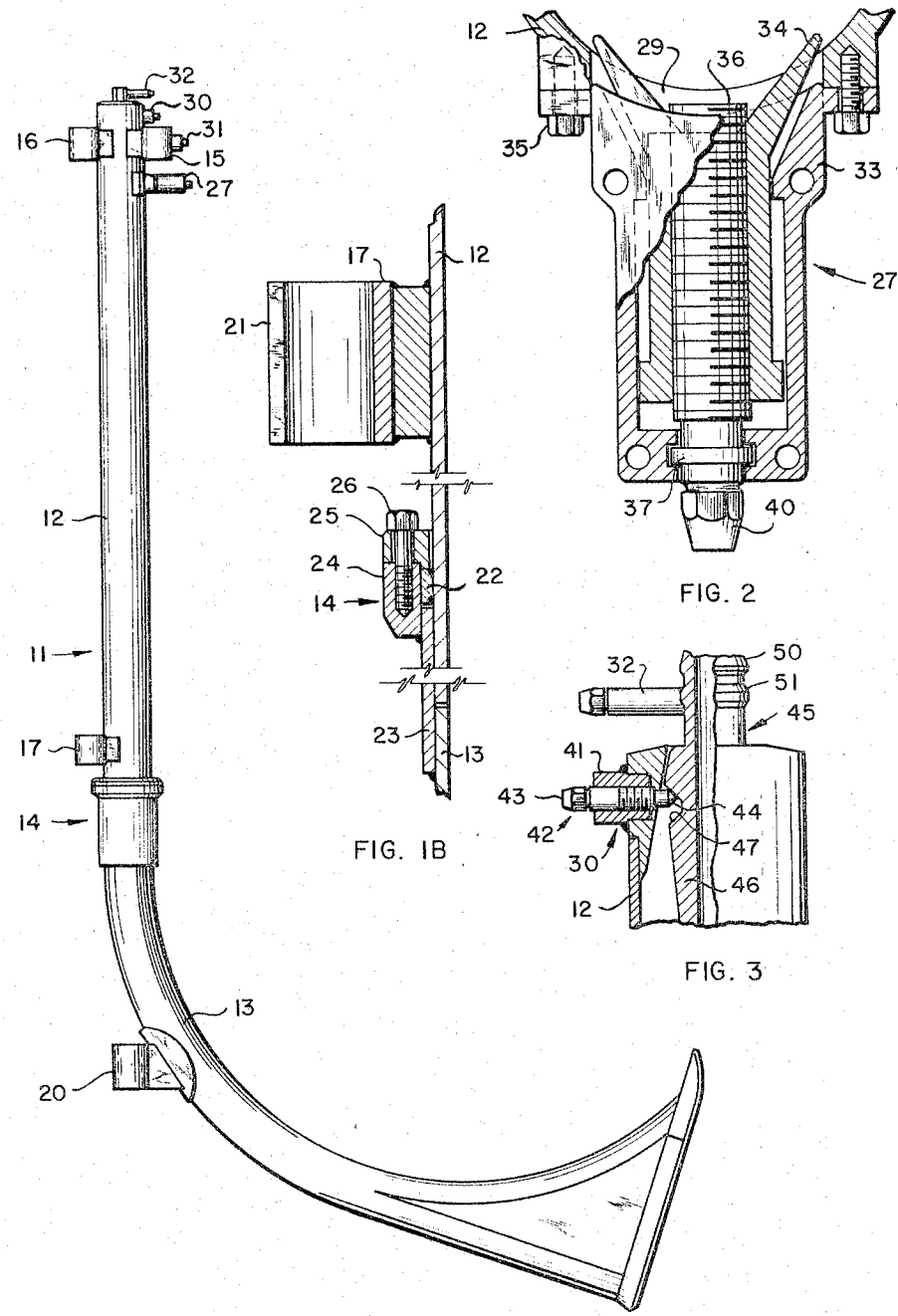

INVENTORS:
J. RONALD DOZIER
GLENN D. JOHNSON
BY:
THEIR ATTORNEY

Jan. 17, 1967 J. R. DOZIER ETAL 3,298,092
CONNECTION OF UNDERWATER FLOWLINES
Filed March 23, 1964 6 Sheets-Sheet 4
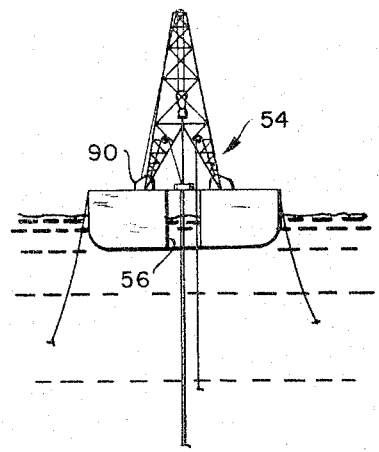
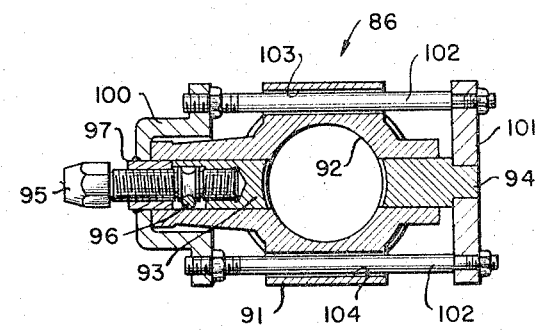
FIG. 9
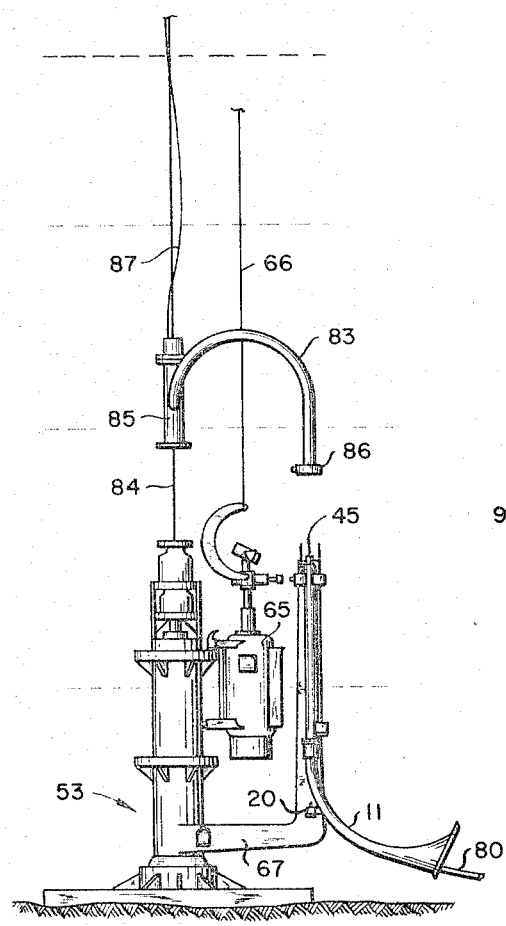
FIG. 8
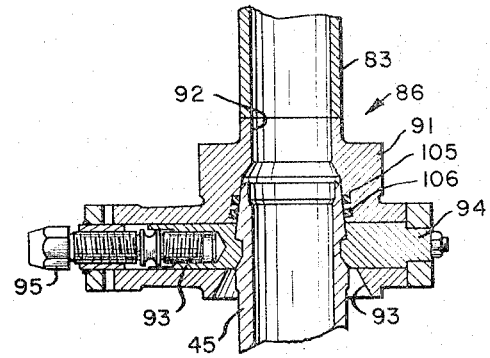
FIG. 10
INVENTORS:
J. RONALD DOZIER
GLENN D. JOHNSON
BY: *John R. Wildema*
THEIR ATTORNEY INVENTORS:
J. RONALD DOZIER
GLENN D. JOHNSON
BY: *John L Wilhelm*
THEIR ATTORNEY

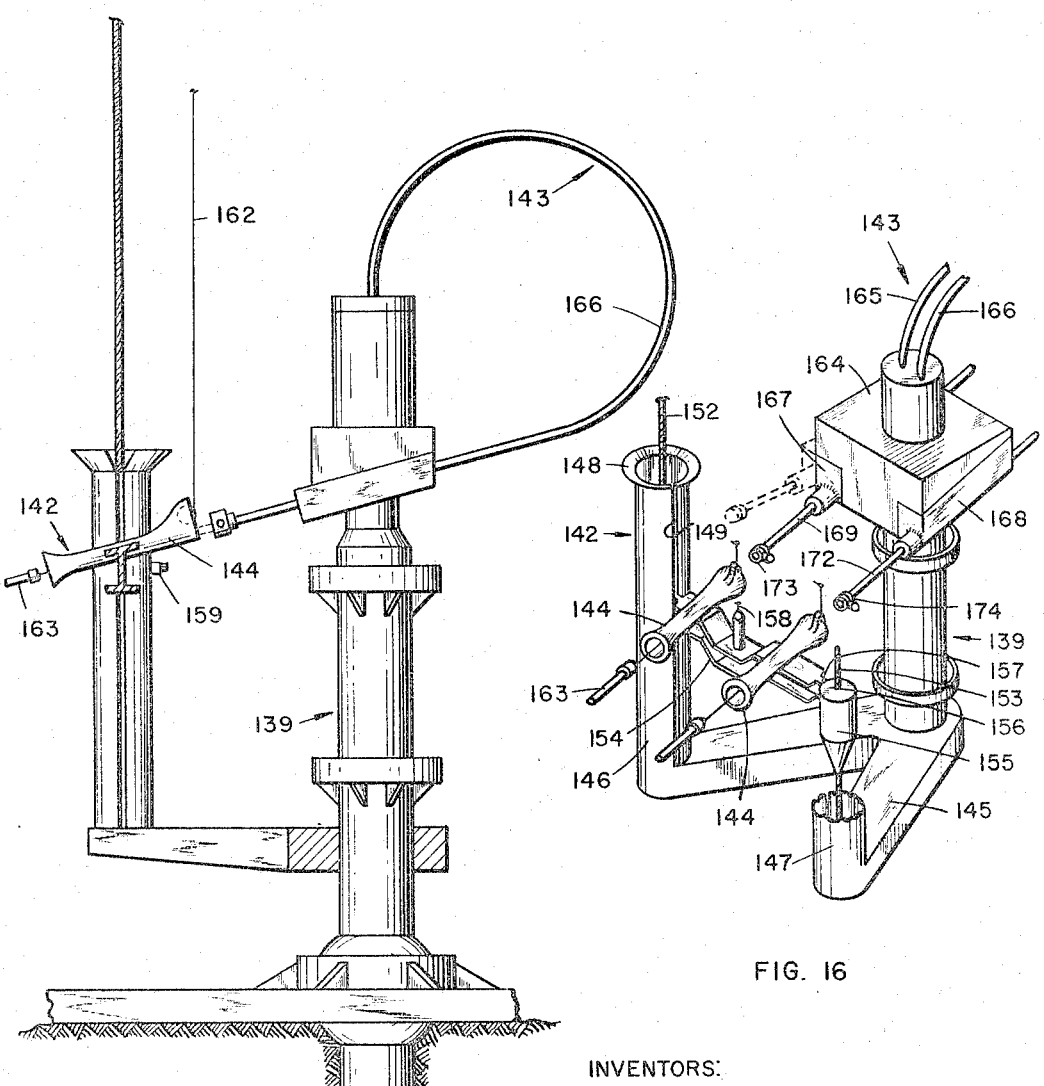

United States Patent Office 3,298,092
Patented Jan. 17, 1967

3,298,092
CONNECTION OF UNDERWATER FLOWLINES
James Ronald Dozier, Whittier, and Glenn D. Johnson, Downey, Calif., assignors to Shell Oil Company, New York, N.Y., a corporation of New York
Filed Mar. 23, 1964, Ser. No. 353,840
15 Claims. (Cl. 29—429)

This invention relates to offshore wells drilled in earth formations located below a body of water, wherein the wellhead equipment of the well is submerged within the body of water. More specifically, this invention is directed to a method and apparatus for remotely coupling a conduit to an installation submerged within a body of water. The apparatus includes both the coupling mechanism to establish sealed communication between the installation and conduit and the coupling facilitating structure to be used in combination with the coupling mechanism.

For many years offshore wells have been drilled either from stationary platforms anchored to the ocean floor, movable barges temporarily positioned on the ocean floor, or from movable barges floating on the body of water in which drilling operations are being conducted. Regardless of the manner in which the wells are drilled, most wells have been completed in a manner such that the outermost tubular member of the well extends upwardly from the ocean floor to a point above the surface of the body of water where a wellhead assembly or Christmas tree is mounted for controlling the production of the well.

Wellheads extending above the surface of a body of water have the disadvantage that they constitute a hazard to navigation in the vicinity of the well. In addition, when such weelheads are positioned in salt water, such as found in the ocean, the structure extending above the water is subject to the corrosive action of salt water and air. Positioning the wellhead and/or casing head above the surface of the body of water has the advantage, however, that the flow handling and controlling components of the wellhead may be readily secured thereto and adjusted by an operator working from a platform adjacent to the wellhead structure.

Recently, methods and apparatuses have been developed for drilling and completing oil and gas wells in the ocean floor in a manner such that after completion of the well the wellhead assembly is positioned beneath the surface of the ocean, preferably on the floor thereof. In practice, these wellhead assemblies are often positioned in depths of water greater than the depth at which a diver can safely and readily work. Thus, the coupling of flow conduits to such wellhead assemblies presents a new and difficult operation which is not readily carried out by presently available well-working equipment.

The problem of securing flowlines to installations submerged in very deep bodies of water is particularly acute because of the high ambient pressures involved and the difficulty of handling long lengths of pipe remotely. This problem is accompanied by the natural problems that are encountered when lowering flowlines to the bottom of relatively deep bodies of water. The high ambient pressure makes the use of flexible connection facilitating conduits generally impractical, since such conduits are very expensive and relatively rigid when fabricated to withstand the high pressures encountered. The use of flexible conduits is also often objectionable, since such conduits do not generally facilitate the passage of pumpable through-the-flowline tools therethrough. The latter characteristic is particularly detrimental, since pumpable through-the-flowline tools provide one of the most practical solutions to the workover problems encountered in submerged wells. Long lengths of pipe are difficult to handle when submerged deeply in a body of water both because of the mass of pipe involved and the remoteness of the handling operation. It is noted that it is particularly difficult to lower long lengths of pipe directly into communication with a deeply submerged underwater installation because the exact length of pipe required to reach the installation is impossible, as a practical matter, to determine.

It is, accordingly, a principal object of this invention to provide a method and apparatus for remotely connecting a flowline to an installation submerged in a deep body of water while overcoming the aforediscussed difficulties. The objects of the inventive method are accomplished by providing the installation with an alignment tube and extending a drawline through this tube. The provision of the alignment tube and the extending of the drawline therethrough may be accomplished either before or after the installation is submerged. After the installation is provided with the alignment tube, one end of the drawline extending therethrough is secured to the flowline to be connected to the installation and tension is applied to the other end of the drawline. Thus, the flowline is drawn into the alignment tube. In the case where the flowline is fabricated from a relatively rigid steel, the flowline may be plastically deformed as it is pulled through the alignment tube. Upon being pulled through the alignment tube, the flowline is secured in a position wherein the end thereof pulled through the tube projects through one end of the tube. The connection is completed by securing the end of the flowline extending through the alignment tube in fluid communication with the installation.

In a broad aspect, the apparatus of the present invention may be defined as a system to facilitate the remote joining of a flowline to an installation submerged in a body of water from a station located on the surface thereof. The apparatus comprises at least one guide element fixed to the installation and the guide line extending between the element and the station located on the surface of the body of water. Included as an essential element of the apparatus is an alignment tube having an internal diameter slightly larger than the external diameter of the flowline. A guide line receiving means, such as a tubular sleeve, is fixed to the alignment tube and adapted to slide along the guide line and into engagement with the guide element. To complete the basic apparatus, the alignment tube is also provided with a mechanism to secure it to the installation and with a flexible drawline extending therethrough to pull a flowline into and through the tube.

In its more specific aspects, the apparatus of the invention includes a coupling adapted to secure a jumper conduit to the end of the flowline drawn through the alignment tube and an attaching mechanism for securing the flexible drawline to the flowline to be drawn through the tube. The coupling and attachment mechanisms are particularly suited for use with the alignment tube of the aforedescribed combination and are adapted to be remotely operated through means of a manipulator, such as described in detail in U.S. Patent No. 3,166,123. The attachment mechanism for securing the flexible line to the flowline is particularly designed so that it may be pulled through the alignment tube along with the flowline.

The foregoing and other objects of the invention and the specifics thereof will be more fully understood from the following detailed description when taken in conjunction with the accompanying drawings, wherein:

FIGURE 1A illustrates a side view of one form of an alignment tube;

FIGURE 1B illustrates an enlarged sectional view of the swivel joint of the alignment tube illustrated in FIGURE 1A;

FIGURE 2 illustrates a detailed plan section of the mechanism utilized to center a flowline in the alignment tube of FIGURE 1A;

FIGURE 3 illustrates a vertical section of the mechanism utilized to lock a flowline within the alignment tube of FIGURE 1A;

FIGURE 8 illustrates the alignment tube installed as shown in FIGURE 7, after a flowline has been completely engaged therein, and the installation of a jumper tube between the flowline and the underwater installation;

FIGURE 9 illustrates a plan section of the union adapted to secure a jumper tube to a flowline drawn through the alignment tube as illustrated in FIGURE 8;

FIGURE 10 illustrates a vertical section of the union shown in FIGURE 9, with the jumper tube and flowline secured thereto;

FIGURE 15 illustrates a side elevation, partially in section, of a wellhead provided with alternative alignment tube and jumper conduit; and, FIGURE 16 is a perspective view illustrating the wellhead and alignment tube arrangement of FIGURE 15.

Figures 4, 5, 6:
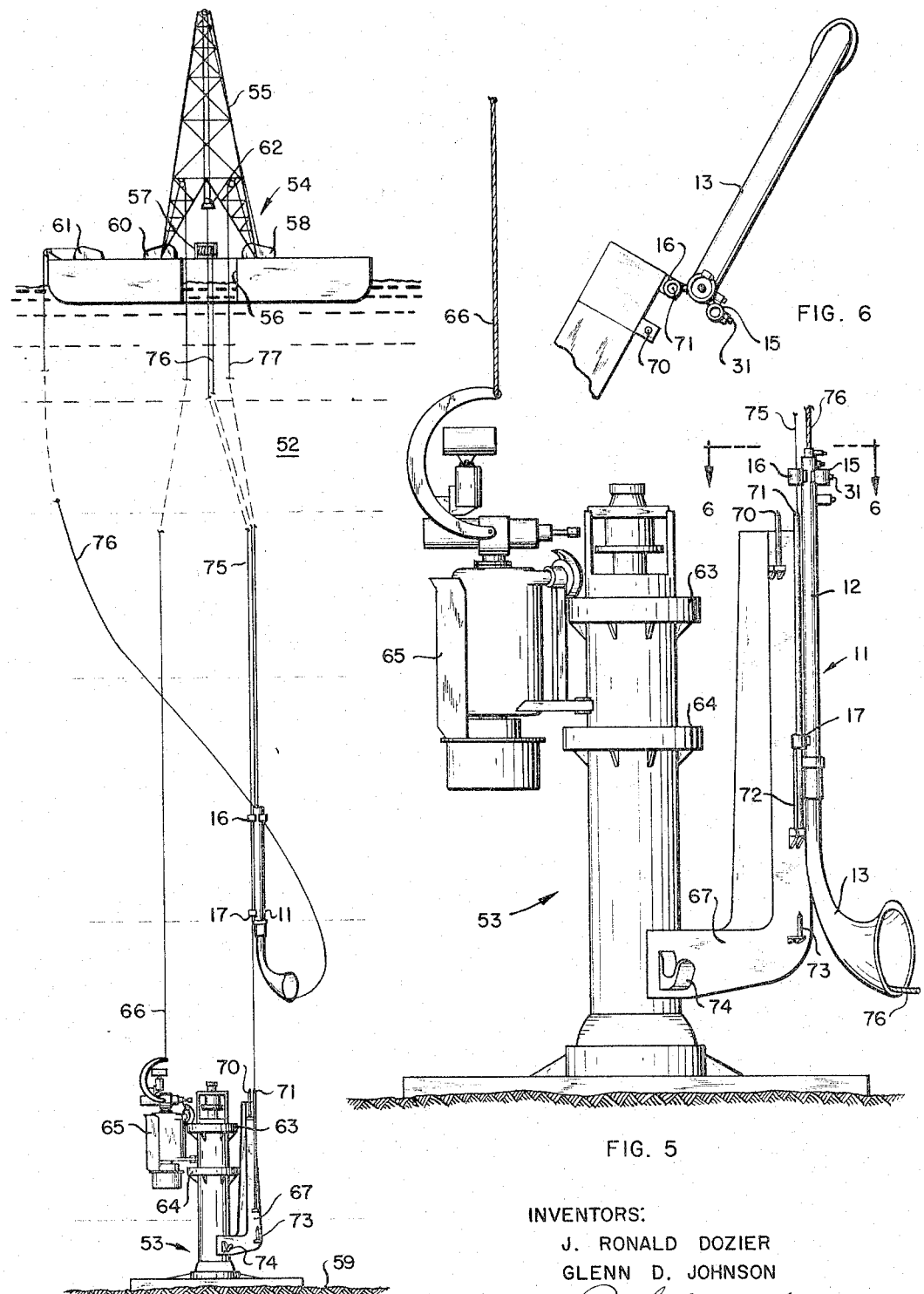
FIGURES 4 and 5 illustrate side views of an underwater installation with the alignment tube of FIGURE 1A in the process of being installed thereon.
FIGURE 6 illustrates a plan section taken on line 6—6 of FIGURE 5.

Referring now to FIGURE 1A, therein is illustrated a J-shaped alignment tube 11, hereafter referred to as a J-tube, including a longitudinal segment 12 and a lateral segment 13. The segments 12 and 13 are joined by a swivel section 14 adapted to secure the segments together for pivotal movement about the longitudinal axis of the segment 12. The detailed structure of the swivel 14 will be developed subsequently with respect to FIGURE 1B. Included on the segment 12 are a pair of upwardly disposed mounting brackets 15 and 16 and a lower mounting bracket 17. These brackets facilitate both the guidance of the J-tube 11 into engagement with an underwater installation and the securing of the J-tube on the installation. It is noted that brackets 16 and 17 are axially aligned in order that they may be threaded over a guide line and guide pin. The segment 13 is provided with a mounting bracket 20 in axial alignment with the longitudinal axis of the segment 12 and adapted to support the segment 13 on an underwater installation for rotational movement about said axis.

FIGURE 1B illustrates an enlarged vertical section showing both the detailed structure of the swivel section 14 and the lower mounting bracket 17. From this figure it can be seen that the bracket is fixedly welded to the segment 12 and is provided with a keyway 21 in the side thereof most remote from the segment 12. In application of the J-tube, as will be developed subsequently, the keyway 21 is adapted to engage a key in order to orientate the segment 12 and prevent it from rotating about its longitudinal axis. From FIGURE 1B it can also be seen that the swivel section 14 includes annular plate sections 22 and 23 fixed to the segments 12 and 13, respectively, adjacent the joined ends thereof. The swivel section also includes an annular retaining element 24 welded to the section 23 and an annular retaining element 25 fixed to the element 24 by a bolt 26 so as to sandwich the annular plate section 22 slidably between said elements and the annular plate section 23. Thus it can be seen that the swivel section 14 provides for rotational movement between the segments 12 and 13, while restricting axial movement therebetween.

The J-tube 11 illustrated in FIGURE 1A includes at the upper end thereof a conduit centering device 27 adapted to force a flowline pulled through the segment 12 into approximate alignment with the longitudinal axis thereof, and a flowline locking mechanism 30 adapted to secure a flowline pulled through the J-tube in fixed engagement with the segment 12. The device 27 and mechanism 30 are illustrated in greater detail in FIGURES 2 and 3, respectively. FIGURE 1A also illustrates a set screw 31 threadingly extending through one side of the mounting bracket 15, and a disengage mechanism 32 mounted on the upper end of the segment 12 laterally of the opening extending therethrough. The set screw 31 is of conventional structure and is intended to be used to secure the bracket 15 to a guide pin upon which it is received. The detailed structure and operation of the mechanism 32 will become apparent subsequently with respect to the description of FIGURE 13. It is noted that each of the elements 27, 30, 31 and 32 are adapted to be remotely operated through means of torque imparting mechanisms, such as the manipulator of aforementioned U.S. Patent No. 3,166,123.

Referring now to FIGURE 2, the conduit centering device 27 is shown therein as comprising a housing 33 having an extensible and retractable centering shoe 34 slidably received therein. The housing 33 is mounted on the cylindrical segment 12 of the J-tube in such a manner that the centering shoe 34 is adapted to pass through an opening 29 provided therefore in the segment. The housing 33 is secured to the segment 12 in alignment with the opening 29 by bolts 35. Movement is imparted to the centering shoe 34 through means of a drive screw 36 threadably received therein and secured to the housing 33 through an annular collar 37 which permits rotational movement between the elements 33 and 36, while restricting longitudinal movement therebetween. Rotational movement is imparted to the screw 36 through means of the head 40 thereof which extends externally of the housing 33 in a position where it may be engaged by a torque imparting tool, such as the manipulator of aforementioned U.S. Patent No. 3,166,123.

In operation of the centering device 27, the shoe 34 is retracted into the housing 33 during the time a flowline is being drawn through the J-tube. After a flowline has been drawn through the segment 12 to the desired extent, the screw 36 is turned in order to force the shoe 34 into the engagement with the flowline within the segment 12. Upon engaging the flowline, the shoe 34 functions to push the flowline to a position wherein its center line coincides substantially with that of the longitudinal axis of the segment 12, or is at least parallel thereto. In this position, the end of the flowline extending through the segment 12 is also positioned so that its axis coincides with the longitudinal axis of the segment 12. Thus, the end of the flowline extending through the segment 12 is definitely orientated so as to facilitate the connection of other conduits thereto. It is noted that the centering device 27 is generally necessary because a conduit pulled through the curved lateral section 13 of the J-tube is necessarily bent and, thus, does not always assume a position wherein the end thereof extending through the segment 12 will be aligned with the longitudinal axis of the segment.

FIGURE 3 illustrates the flowline locking mechanism 30 and the manner in which it cooperates to lock a flowline within the segment 12. The mechanism 30 comprises a threaded sleeve 41 fixed to and extending through the segment 12 and a locking bolt 42 threadably received within the sleeve. The bolt 42 is provided at one end thereof with a driving head 43 and at the opposite end thereof with a tapered locking surface 44 adapted to engage a flowline received within the segment 12. In operation, it is merely necessary to screw the bolt 42 into the sleeve 41 so that the surface 44 engages a flowline received in the segment 12.

FIGURE 3 also illustrates the particular construction of the end 45 of a flowline which is adapted to cooperate both with the locking mechanism 30 and conduit and cable couplings adapted to be secured to the conduit. The latter couplings and the manner in which they cooperate with the flowline end 45 will be developed subsequently. The structure of the flowline end 45 adapted to cooperate with the locking mechanism 30 comprises an enlarged section 46 having an annular groove 47 extending therearound and adapted to be engaged by the tapered surface 44 of the locking bolt 42. The portion of the end 45 adapted to be coupled to the conduit and cable couplings comprises an extended end section 50 having an annular groove 51 formed therein.

Referring now to FIGURE 4 therein is illustrated an exemplary application of the invention in use in a body of water 52. In the application of FIGURE 4, the invention is being utilized to secure a flowline in fluid communication with an underwater installation taking the form of a wellhead 53 located on the floor 59 of the body of water 52. In order to facilitate the application of the invention, an operating station taking the form of a floating barge 54 is located on the surface of the body of water 52 in a position approximately above the wellhead 53. The barge 54 is of relatively conventional structure and includes a derrick 55 having a well 56 thereunder communicating with the body of water. The barge 54 also includes a plurality of winches 57, 58, 60 and 61 positioned on the deck thereof so as to be adapted to selectively reel lines into and out of the body of water 52 with a predetermined amount of tension. The movement of elements supported by the derrick 55 is controlled through means of a travelling block 62 carried thereby.

In the application of FIGURE 4, the wellhead 53 is shown as being provided with annular tracks 63 and 64 therearound to support a manipulator 65 of the type described in said U.S. Patent No. 3,166,123. The manipulator 65 is lowered to the wellhead 53 and provided with control signals through means of a line 66 extending between the manipulator and the winch 60 carried by the barge 54. The wellhead 53 is also provided with an outrigger arm 67 fixedly secured to and extending from one side thereof. Included on the outrigger arm 67 are a pair of longitudinally extending guide elements taking the form of pins 70 and 71 spaced and dimensioned so as to be adapted to be received within the mounting brackets 15, 16 and 17 of the aforedescribed J-tube 11. As can be seen more clearly from FIGURE 5, the guide pins 70 and 71 are spaced slightly from the outrigger arm 67 and a key 72 extends between the lower end of the pin 71 and the surface of the arm 67 facing the pin in a position wherein it is adapted to pass into the keyway 21 of the bracket 17 when the J-tube is completely seated on the outrigger arm. In order to increase the strength of the guide pin 71, the key 72 may be formed as a web extending between the outrigger 67 and pin over substantially the entire length of the pin. In the latter case the key passes into the keyway 21 immediately after the bracket 16 engages the pin 71. The outrigger arm 67 also has supported thereon a pivot pin 73 adapted to engage the aforementioned mounting bracket 20, and is also provided with a stirrup 74 adapted to be selectively used to secure the segment 13 in fixed relationship with respect to the arm 67 to prevent rotational movement thereon, as will be described subsequently.

The aforediscussed outrigger arm 67 and the hardware thereon adapted to cooperate with the J-tube 11 are preferably mounted on the wellhead prior to its installation on the floor 54. After the wellhead 53 has been mounted on the ocean floor, as illustrated in FIGURES 4 and 5, a guide line 75 is extended between the end of the guide pin 71 and the barge 54. The line 75 is preferably secured to the barge through means of a reeling mechanism, such as a winch 57. The guide line 75 may be extended between the barge and wellhead either by securing it to the guide pin 71 prior to the time the wellhead 53 is lowered to the floor 54, or by securing the line 75 to the pin 71 after the installation of the wellhead through remotely operable means, such as the manipulator 65 or a diver.

With the guide line 75 extended between the barge 54 and the wellhead 53, the arrangement illustrated in FIGURES 4 and 5 is in condition for the installation of the J-tube in its operative position. Installation of the J-tube 11 is commenced by stringing the guide line 75 through the aligned mounting brackets 16 and 17 while the J-tube is held on the barge 54. At this point it is noted that the keyway 21 in the bracket 17 is of insufficient width to permit the guide line 17 to be pulled therethrough, but that the cylindrical passages in the brackets 16 and 17 are of sufficient diameter to slide freely over the guide line. Ideally, prior to the stringing of the brackets 16 and 17 on the guide line, or immediately thereafter, a drawline 76 is strung through both segments of the J-tube 11 and the ends of the drawline are secured to reeling mechanisms, such as the winches 57 and 61. Prior to the lowering of the J-tube 11 into the body of water, a running line 77 is secured between the upper end thereof and winch 58. The latter line provides for the controlled lowering of the J-tube 11 down the guideline 75. As an alternative for the running line 77, the J-tube 11 may be lowered on a tubular pipe string. The latter arrangement has the advantage that torque may be imparted to the J-tube through the string in order to effect turning of the tube.

Once the J-tube is orientated with respect to the various lines, as described above, lowering of the tube through the well 56 and into the body of water 52 is accomplished by simultaneously paying out the running line 77 and both ends of the drawline 76. Thus, the J-tube 11 slides along the guide line 75, as illustrated in FIGURE 4, until the lower mounting bracket 17 contacts the guide pin 71. At this point, continued lowering of the J-tube functions to slide the bracket 17 over the guide pin 71. Upon contact of the lower mounting bracket 17 with the key 72, the entire J-tube assembly is pivoted about the axis of the guide pin 71 until the keyway 21 in the bracket 17 is aligned with the key 72. Rotation of the J-tube assembly is preferably accomplished through means of the manipulator 65. At this point it is noted that the key 72 extends along the length of the guide pin 71 a sufficient distance so that the bracket 17 will abut thereagainst prior to the time the brackets 15 and 16 contact the pins 70 and 71, respectively. Thus, the brackets 15 and 16 cannot engage the guide pins 70 and 71 until the key 72 and keyway 21 are aligned and engaged. The keyway 21 and the brackets 15 and 16 are so orientated relative to each other that when the keyway is engaged on the key 72, the cylindrical passages in the brackets 15 and 16 will be aligned with the guide pins 70 and 71. Continued downward movement of the J-tube after aligned engagement of the keyway 21 and key 72 thus functions to engage the brackets 15 and 16 on the guide pins 70 and 71, respectively, since the passages in the brackets are dimensioned to slide over the guide pins.

Lowering of the J-tube 11 and the mounting brackets thereon into engagement with the guide pins 70 and 71 also functions to bring the mounting bracket 20 into engagement with the pivot pins 73. Whether a segment 13 of the J-tube is free to pivot about the pin 73, or such pivoting is restricted, is dependent upon the position the lower extremity of the segment assumes as the mounting bracket 20 engages the pin 73. If upon engagement of the bracket 20 on the pin 73, the lower extremity of the segment 13 is aligned with the stirrup 74, the segment will engage the stirrup and pivotal movement of the segment will be restricted. However, if the stirrup and segment are not so aligned, the segment 13 will be free to pivot about the pin 73. The orientation of the segment 13, and therefore its pivotal condition, can be controlled through means of the manipulator 65.

After the J-tube 11 is fully engaged on the guide pins 70 and 71, the tube is secured in position by tightening the set screws 31 into engagement with the guide pin 70. Tightening of the set screw 31 is accomplished through means of the manipulator 65. Once the J-tube is so secured, the guide line 75 and running line 77 may be disconnected from guide pin 71 and J-tube 11, respectively. The latter lines are preferably secured to the guide pin and J-tube through means of a set screw arrangement (not illustrated) which may be remotely actuated by the manipulator 65. These set screw may take a form corresponding substantially to that of the previously described locking bolt 42.

It is noted that the mounting of the J-tube on the installation could in some instances be completed before the installation is submerged in the body of water 52, thus alleviating the need for the aforedescribed procedure. Furthermore, instances may also occur where it is desirable to string the drawline 76 through the J-tube after it is mounted on the installation.

Figure 7:
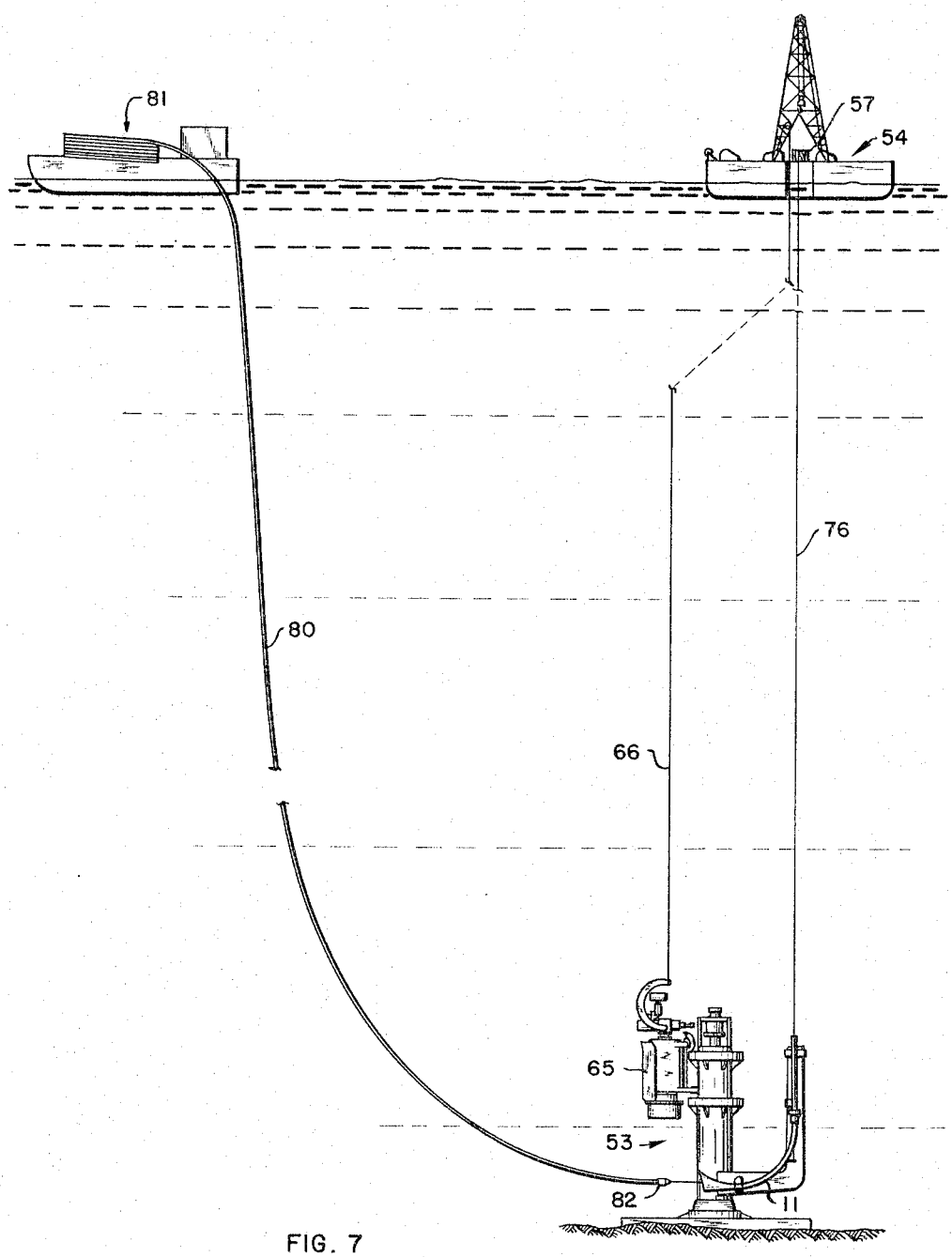
FIGURE 7 illustrates the alignment tube of FIGURE 1A fully installed on underwater installation and being utilized with the method of the present invention to draw a flowline into engagement with the installation.

Referring now to FIGURE 7, therein is illustrated the J-tube 11 in the act of being utilized to draw a flowline 80 into engagement with the wellhead. The flowline 80 is shown as it is being paid out from a lay barge 81 spaced laterally of the barge 54 and moving away therefrom. In the condition illustrated in FIGURE 7, the lines 75 and 77 have been removed and the end of the drawline previously secured to the winch 61 has been secured to the flowline 80 through means of a releasable coupling. It is noted that both the flowline 80 and the coupling 82 are of a small enough diameter to pass through J-tube 11 and that the relative strengths of the J-tube and flowline are such that the flowline may be deformed upon being drawn into the J-tube. The flowline 80 would typically be fabricated of steel.

After the flowline 80 is secured to the drawline 76, tension is applied to the drawline while the flowline is paid out from the barge 81 and, thus the flowline is pulled toward the wellhead 53 as illustrated in FIGURE 7. The tension applied to the flowline through means of the flowline handling means and movement of the barge 81 may be controlled, as described in copending application Serial No. 353,979 filed March 23, 1964, to limit the bending and axial stresses applied to the flowline. Movement of the barge 81 is preferably restricted until the flowline 80 is fully engaged in the J-tube 11. After engagement of the flowline in the J-tube, continued laying of the flowline is accomplished by moving the barge 81 in the direction it is desired to lay the flowline.

Engagement of the flowline 80 in the J-tube 11 is accomplished by applying continued tension to the drawline 76 in order to draw the flowline from the position illustrated in FIGURE 7 into and through the J-tube to the position illustrated in FIGURES 3 and 8. During the time the flowline is pulled through the J-tube 11 it is plastically deformed and assumes a shape corresponding to that of the J-tube. The shape of the curved lateral segment 13 of the J-tube designed so that the flowline being pulled therethrough will assume a preselected radius, which radius may be critical for certain purposes such as the use of the flowline tools. The amount of tension required to pull the flowline through the J-tube is dependent upon the size and material of the flowline and the degree of bending to which the flowline is subjected in the J-tube. The optimum force may be calculated or determined experimentally and is dictated by the allowable bending and axial stresses that may be applied to the flowline. For example, it has been found that with 2½″ J-55 tubing, a force of 7,500 pounds functions to pull the flowline through the J-tube without kinking or significantly reducing its cross sectional area. Upon being pulled through the J-tube 11, movement of the flowline is terminated when the flowline end 45 protrudes through the tube by a preselected degree. The degree to which the flowline protrudes through the J-tube is controlled by the abutment of the enlarged section 46 of the flowline end 45 on the narrowed upper end of the J-tube, as is clearly illustrated in FIGURE 3. The degree to which the flowline is permitted to protrude through the J-tube is determined so as to facilitate the connection of other conduits to the protruding end.

After the flowline has been pulled through the J-tube 11 to the predetermined degree, the drawline 76 is disconnected therefrom. At this point, the locking bolt 42 is screwed into the conditions illustrated in FIGURE 3 by the manipulator 65, thus fixing the flowline in the J-tube. Once the flowline has been pulled through the J-tube, the conduit centering device 27 may also be operated through means of the manipulator 65 to bring the axis of the flowline more nearly into alignment with the axis of the segment 12 of the J-tube. FIGURE 8 illustrates the manipulator 65 in the position that it would assume when actuating the centering device 27 and locking mechanism 30.

Upon complete engagement of the flowline 80 in the J-tube 11, communication between the flowline end 45 and the interior of the wellhead 53 is established by extending a conduit into fluid communication between said elements. FIGURE 8 illustrates an arrangement designed to facilitate the communication of a jumper conduit 83 between the top of the wellhead 53 and the end 45 of the flowline 80. As illustrated in this arrangement, the lines 75 and 76 have both been removed from the aforedescribed position and a guide line 84 has been extended between the barge 54 and the center of the wellhead 53. The guide line 84 may be so extended either through the use of divers or preferably, through the use of the manipulator 65.

After the guide line 84 has been extended to the wellhead 53, the jumper conduit 83 is lowered down the guide towards the wellhead, as illustrated in FIGURE 8. It is noted that the jumper conduit 83 is illustrated as being connected to a Christmas tree 85 having a passage therethrough adapted to slide down the guide line. However, it is to be understood that alternative guide means, such as simple guide sleeves secured to the jumper conduit, may be used in place of the Christmas tree 85 without departing from the invention. The use of a Christmas tree has the advantage, however, that it provides means whereby the jumper tube may be readily connected to the wellhead 53, whereas when other means are used to guide the jumper tube, alternative coupling means must be provided to facilitate this connection. The end of the jumper tube 83 remote from the portion thereof received on the guide line is provided with a union 86 adapted to be operated by the manipulator 65. The details of the union 86 will be developed subsequently with respect to FIGURES 9 and 10. As an alternative to the Christmas tree 85, the end of the jumper tube 83 to be coupled to the wellhead 53 could also be provided with a union similar to the union 86.

In operation of the arrangement illustrated in FIGURE 8, the jumper conduit 83 and its associated structure are lowered through the well 56 in the barge 54 and towards the wellhead 53. A lowering line 87 is secured between the Christmas tree 85 and a winch 90 on the barge 54 to provide for controlled lowering of the jumper conduit. If desired, a pipe string may be substituted for the lowering line 87, thus facilitating both the lowering and turning of the jumper conduit. Preferably the guide line 84 and lowering line 87 are releasably secured to the wellhead 53 and Christmas tree 85, respectively, through manipulator operable set screws. After the jumper tube 83 has been lowered to a position closely adjacent to the wellhead 53, the manipulator 65 is utilized to align the union 86 with end 45 of the flowline. With the jumper tube and flowline so aligned, the jumper conduit is lowered into engagement with the flowline, at which time the Christmas tree 85 engages the wellhead 53. In the latter condition, the manipulator 65 is utilized to activate the coupling elements on both the Christmas tree 85 and jumper conduit 83, thus completing the connection between the wellhead and the flowline 80. It is noted that the coupling on the Christmas tree 85 may take substantially any form which is manipulator operated, such as that of the union 86 to be described subsequently. Once the coupling of a jumper conduit is completed, the lines 84 and 87 may be removed from the wellhead 53 and Christmas tree 85, respectively, through use of the manipulator 65. If desired, the guide line 84 may be utilized to couple other elements to the upper end of the Christmas tree, such as an element to close the upper end of a Christmas tree.

FIGURES 9 and 10 illustrate plan and vertical sections of the union 86 referred to previously with respect to FIGURE 8. The union comprises a housing 91 having an opening 92 extending therethrough of a diameter sufficient to receive the end 45 of the flowline. The upper end of the opening 92 is secured, as by welding, in sealed communication with the jumper conduit 83 and the lower end of the opening is provided with a flared out section 93 to facilitate the entrance of the flowline end 45 thereinto. Slidable shoes 93 and 94 are disposed in the housing so as to be selectively movable into and out of the opening 92. The shoes 93 and 94 are selectively moved through the means of a manipulator operable bolt 95 retained within the housing 91 for pivotal movement by a pin 96. The ends of the bolt 95 on opposite sides of the pin 96 are threaded in opposite directions. The forward end of the bolt 95 is threaded directly into the shoe 93 and the rear end thereof is threaded into a sleeve 97 which is fixed to a carriage including a pair of end plates 100 and 101 bolted together in fixed relation by a pair of through bolts 102. The end plate 101 is, in turn, fixedly secured to the shoe 94. As is apparent from FIGURE 9, the through bolts 102 are slidably received in passages 103 and 104 extending through the housing 91.

From the aforedescribed structure of the union 86, the operation in coupling the jumper conduit 83 to the flowline end 45 is believed apparent. Specifically, in this operation once the conduit 45 has entered the opening 92, as illustrated in FIGURE 10, the bolt 95 is turned by the manipulator 65 and the shoes 93 and 94 are moved into the opening 92. Upon moving into the opening 92, the ends of the shoes 93 and 94 engage the annular groove 51 in the end 45, thus securing the end within the housing 91. It is noted that the ends of the shoes 93 and 94 are formed so as to mate with the groove 51 and the surfaces on the groove 51 and the ends of the shoes are formed so that the end 45 is cammed into pipe engagement with the external surface of the opening 92.

In order to assure that the end 45 will sealingly engage the housing 91, and thus be in sealed communication with the jumper conduit 93, O-rings 105 and 106 may be provided in the opening 92 at the point where it is contacted by the upper portion of the end 45.

Figure 11:
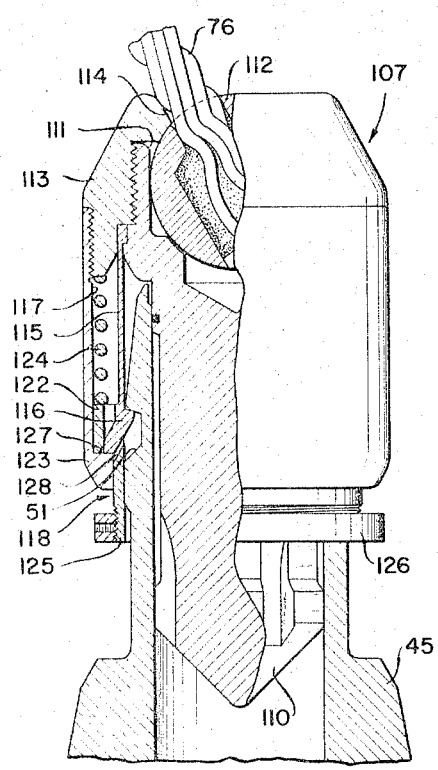
FIGURE 11 is a side elevation, partially in section, illustrating a preferred form of rope socket adapted to be secured to a flowline to be pulled through the alignment tube of FIGURE 1A.

Referring now to FIGURE 11, there is illustrated a rope socket or attachment 107 adapted to be releasably coupled to the end 45 of the flowline 80 in order to secure the drawline 76 to the flowline. From FIGURE 11 it can be seen that the socket 107 has an external diameter of less than that of the end 45 and thus, may be pulled through the J-tube 11 without obstruction. The socket 107 includes a probe or mandrel 110 or a diameter closely approaching the internal diameter of the end 45, but sufficiently smaller than said internal diameter to slide into the end. The upper end of the probe 110 has provided therein a socket 111 adapted to receive a ball 112 which is fixedly secured to the drawline 76. The ball 112 is retained within the socket 111 for limited pivotal movement by a retaining sleeve 113 threadably received on the upper end of the probe 110. The retaining sleeve 113 has an opening 114 extending therethrough of a diameter less than that of the ball 112, but greater than that of the line 76, in order that the line may move relative to the rope socket upon pivotal movement of the ball 112. Thus, the rope socket 107 provides both for the secured attachment of a drawline 76 to the socket and for some flexibility between the line and the socket.

Figure 12:
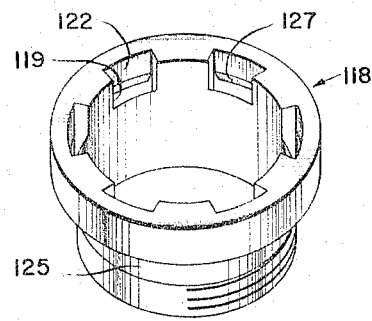
FIGURE 12 is a perspective view of the release cage for the rope socket of FIGURE 11.

The rope socket 107 is releasably secured to the flowline end 45 by a series of fingers 115 arranged in annular rings around the inside of the socket in a position where the detents 116 formed thereon are adapted to engage the groove 51 of the end 45 when said end is inserted into the rope socket as illustrated in FIGURE 11. The fingers 115 (only one of which is illustrated) are fabricated of resilient material, such as steel, in order that they may be either biased into the engaged position illustrated in FIGURE 11 or into a retracted position (not illustrated) in a cavity 117 in the retaining sleeve 113. The detents 116 are biased into the engaged position illustrated in FIGURE 11 by an annular cage 118, illustrated in full in FIGURE 12. The cage 118 has formed therein a plurality of openings 119 through which the detents 116 extend. The cage 118 includes biasing elements 122 positioned adjacent each of the openings 119 in a location where they bias the detents 116 inwardly, as illustrated in FIGURE 11, when the cage is at the lower extremity of its movement.

It is noted that the section of the cage 118 containing the biasing elements 122 is slidably received within the cavity 117 of the rope socket 107 and that downward movement of the cage is limited by an abutment of the annular section carrying the elements 122 with an annular section 123 of reduced diameter formed at the lower extremity of the retaining sleeve 113. The cage 118 is normally biased to the position illustrated in FIGURE 11 by a coil spring 124 received in the cavity 117 in a position where it is interposed between the upper surface of the cavity and the upper surface of the cage 118. Retraction of the fingers 116 into the cavity 117 and resultant release of the groove 51 from the detents 116 is accomplished by applying an upward force to a lower end 125 of the cage extending below the retaining sleeve 113. The lower section 125 of the cage 118 is slidably received within the annular section 123 of the retaining sleeve 113 and an enlarged bearing element 126 is threadably received on the portion of the end 125 extending below the sleeve 113.

In order to facilitate movement of the detents 116 into and out of the cavity 117, the openings 119 in the cage 118 are provided with sloped surfaces 127 and 128 positioned to bias the detents 116 inwardly and outwardly upon downward and upward movement of the cage, respectively. The bearing element 126 is so positioned on the cage 118 that it does not restrict the retracting operation of the surfaces 128, but at the same time limits upward movement of the cage to a position where it will not hang upon downward and upward movement of the cage, results in 118 provides for both the extension and retraction of the fingers 116. It is also believed apparent that the rope socket 107 provides means whereby the line 76 may be securely attached and readily removed from the end 45 of the flowline 80. Secure engagement of the rope socket 107 with the end 45 is particularly effective since the end is interposed between the probe 110 and the fingers 116 when engaged by the socket.

Figure 13:
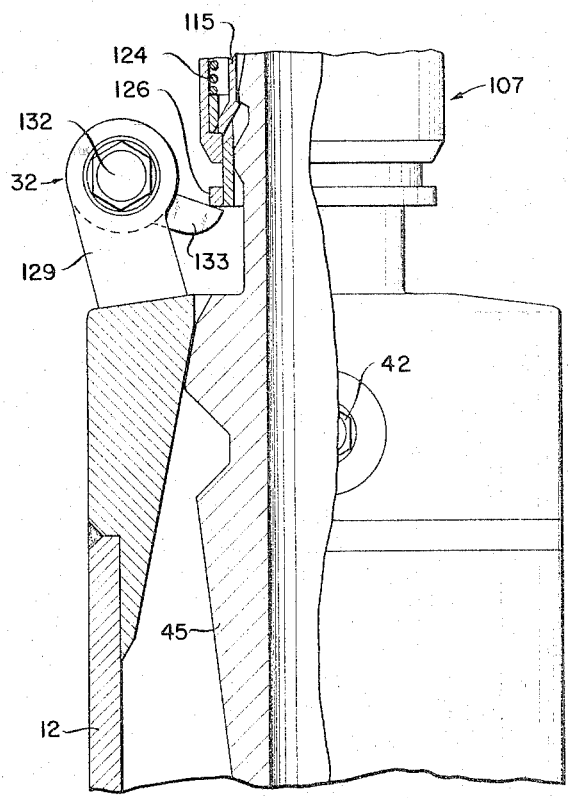
FIGURE 13 is a side view, particlly in section, illustrating the cam arrangement adapted to release the rope socket of FIGURE 11 from a flowline engaged in the alignment tube of FIGURE 1A.

FIGURE 13 illustrates the disengage mechanism 32 adapted to disengage the rope socket 107 from the flowline end 45. The mechanism 32 includes a bearing 129 fixed to and extending upwardly from the longitudinal segment 12 of the J-tube 11. The bearing 129 has extending therethrough a manipulator operable bolt 132 which is pivotal about its longitudinal axis and restricted in its longitudinal movement. The bolt 132 has fixed thereto a finger 133 of a length sufficient to extend below the bearing element 126 of the cage 118 when the rope socket 107 has been pulled through the J-tube 11 to a point where the flowline end 45 abuts against the necked down section of the segment 12, as illustrated in FIGURE 13. Ideally, the finger 133 is arranged so that it may either turn freely through 360°, or so that it is biased into the bearing 129 when not being used, since it is necessary that the finger not interfere with the pulling of the rope socket 107 through the J-tube segment 12.

In operation of the disengagement mechanism 132, once the rope socket has been pulled to the position illustrated in FIGURE 13, it is merely necessary to activate the manipulator 65 in order to turn the bolt 132 to a position where the finger 133 pushes the cage 118 to a position wherein it retracts the fingers 115. Thus, it can be seen that the rope socket 107 and the associated disengage mechanism 32 provide means whereby the drawline 76 may be fixedly secured to the flowline 45 and selectively and remotely removed therefrom. The rope socket is of a particularly desirable design, since it is facilitated to be pulled through the J-tube 11 without obstruction.

Figure 14:
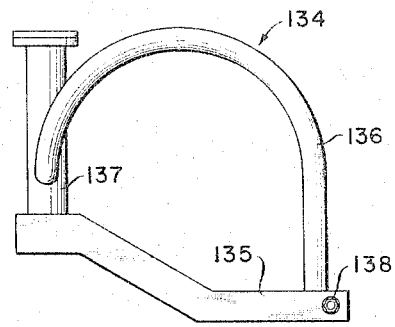
FIGURE 14 is a side elevation of an alternative jumper conduit assembly adapted to be used in the combination shown in FIGURE 8.

Referring now to FIGURE 14, therein is illustrated a jumper tube assembly 134 adapted to be used as an alternative for the jumper conduit 83 illustrated and described with respect to FIGURE 8. The assembly 134 differs from the jumper conduit 83 primarily in that it includes a mounting bracket 135 rigidly holding the jumper conduit 136 thereof in place. As with the jumper conduit 83, the assembly 134 includes a Christmas tree 137 secured in communication with one end of the conduit 136 and a locking union 138 secured to the other end of the conduit and adapted to sealingly engage the flowline end 45. The locking union 138 differs from the previously described union 86 only in that it is housed in the mounting bracket 135, rather than a seperate housing, such as the housing 91.

The jumper tube assembly 134 has the advantage that the bracket 135 rigidly fixes the Christmas tree 137 with respect to the entire length of the jumper tube 136. Thus, when the assembly is lowered to the wellhead, the Christmas tree 137 and jumper tube 136 are certain to stab onto the wellhead 53 and the flowline end 45 simultaneously. The jumper tube assembly 134 has the disadvantage that there is essentially no degree of flexibility between the Christmas tree 137 and jumper tube 136 and, thus, it is difficult to compensate for misalignment between the flowline end 45 and the jumper conduit.

FIGURES 15 and 16 illustrate a wellhead 139 corresponding substantially to the aforementioned wellhead 53 and having received thereon an alternative form of alignment mechanism 142 and jumper tube assembly 143. The alignment mechanism 142 differs from the aforedescribed J-tube arrangement primarily in that it is provided with a pair of alignment tubes 144 and that these tubes are of a substantially straight configuration, rather than J-shaped. The difference in the alignment tube arrangement of FIGURES 15 and 16 is also accompanied by a difference in the structure utilized to guide the alignment mechanism into position on the wellhead and secured in this position, as will be developed subsequently. The jumper tube assembly 143 differs from the aforedescribed jumper tube 83 and assembly 134 mainly in that it is adapted to cooperate with the straight alignment tubes 144 of the mechanism 142 rather than J-shaped alignment tubes.

Referring now to the detailed structure illustrated in FIGURE 16, the wellhead 139 therein is shown as being provided with a bifurcated pair of outrigger arms 145 having extending upwardly from the outer ends thereof guide elements in the form of guide columns 146 and 147. Although the upper section of the column 147 has been broken away for the sake of clarity, it is to be understood that the structure of this column corresponds to that of the column 146. The columns 146 and 147 are formed as hollow cylinders having flanged upper ends and longitudinal slots extending along the facing sides thereof. The flanged end and longitudinal slot in the column 146 are designated by the numerals 148 and 149, respectively. Each of the guide columns 146 and 147 has extending longitudinally therethrough a guide line 152 and 153, respectively, which is secured at its upper end to a barge, such as the aforedescribed barge 54. As will become apparent from the subsequent discussion, the guide lines perform a function corresponding substantially to the aforediscussed guide line 75.

The alignment tubes 144 are fixedly secured to a transverse carrier member 154 having cylindrical alignment elements 155 fixed to the ends thereof. Although only one of the alignment elements 155 is illustrated in FIGURE 16, it is to be understood that a similar alignment element is hidden from view from the guide column 146. The alignment elements 155 are dimensioned and spaced apart so as to be slidably engageable in the cylindrical guide columns 146 and 147. Each of the elements 155 is also provided with a cylindrical passage 156 extending axially therethrough of a diameter sufficient to freely slide on the guide lines 152 and 153. It is also noted that the elements 155 are joined to the carrier member 154 by necked-down sections 157 of a sufficiently small width to freely slide within the facing longitudinal slots of the columns 146 and 147. Thus, it can be seen that the carrier member 154 and its associated alignment elements 155 provide means whereby the alignment tubes 144 may be lowered into fixed orientation to the wellhead 139. In order to facilitate the lowering function, a lowering line 158 is secured to the carrier member and extends to a suitable lowering mechanism, such as a winch, located on a barge above the wellhead assembly.

From the foregoing description of the alignment tubes 144 and their associated carrier and guide structure, the manner in which the alignment tubes may be remotely positioned on the wellhead 139 is believed apparent. At this point it is noted that the outrigger arms 145 and guide columns 146 and 147 are preferably installed on the wellhead prior to the time it is installed at its underwater location. The initial installation of the wellhead is generally accomplished through the utilization of a barge, such as the aforedescribed barge 54, and suitable installation procedures. Most conveniently, the guide lines 152 and 153 are installed in their respective guide columns prior to the installation of the wellhead and are extended to the installation barge either co-currently with the installation, or sometime thereafter.

With the wellhead 139 installed on the floor of a body of water and the guide lines 152 and 153 extending to a barge thereabove, the alignment tubes 144 may be installed on the wellhead in a manner similar to that described previously with respect to the installation of the J-tube 11. Specifically, installation of the tubes 144 is accomplished by threading the elements 155 onto the guide lines 152 and 153 at the barge and then lowering the tubes down the guide lines to the wellhead. Controlled lowering of the tubes is accomplished by extending the lowering line 158 secured to the carrier member 154 to a winch on the barge. After the alignment tubes have been lowered to a position wherein the elements 155 are engaged in the columns 146 and 147, as illustrated in FIGURE 16, the alignment tubes may be fixed in position through means of locking bolts 159 located in the guide columns and adapted to be screwed into engagement with the elements 155 after they are received therein. The locking bolts 159 are preferably operated through means of a remotely controlled manipulator, such as the aforedescribed manipulator 65. Ideally, recesses are provided in the elements 155 to facilitate the engagement of the locking bolts 159 therewith.

The alignment tubes 144 are similar to the aforedescribed J-tube 11 in that drawlines 162 are preferably strung therethrough prior to the time the tubes are lowered to the wellhead assembly. These drawlines, as will be developed in the subsequent discussion, are utilized in a manner similar to the drawline 76 to draw a flowline into the alignment tubes. With respect to the initial installation of the drawlines 162, it is noted that as an alternative to prestringing the drawlines through the alignment tube prior to its installation, stringing of the drawlines may be accomplished otherwise. For example, short lengths of line could be prestrung through the alignment tubes prior to their underwater installation and the ends of these short lengths could be subsequently connected to drawlines. The latter connecting could be accomplished through divers or, preferably through a manipulator, such as the manipulator 65. At this point it is noted that the application of the previously described J-tube is also not intended to be limited to the prestringing of a drawline therethrough. Alternative procedures for stringing the drawline 76 through the J-tube 11 could also be used.

Once the alignment tubes 144 are installed as illustrated in FIGURE 15, the drawing of flowlines into engaegment with the alignment tubes is accomplished in a manner corresponding to that previously described with respect to the J-tube 11. This procedure differs from that of drawing the flowline into the alignment tube 11 only in that the flowline is not engaged by the alignment tubes in the same manner once it enters these tubes. Specifically, once the flowline 163, illustrated in FIGURE 15, enters the tube 144 it is drawn straight through the alignment tube, rather than plastically deformed therein. After the flowline 163 is drawn into the alignment tube 144, it is locked therein and the drawline 162 is removed therefrom. Locking of the flowline 163 in the alignment tube 144 may be accomplished through means of a locking mechanism (not illustrated) corresponding to the aforedescribed mechanism 30. Engagement and disengagement of the flowline 163 with the drawline 162 is facilitated through means of a coupling corresponding with the aforedescribed coupling 82. In order to facilitate the use of the latter mentioned locking mechanism and coupling, the flowline 163 is formed with an end section corresponding to that described with respect to flowline 80.

After the flowline 163 has been drawn into the alignment tube 144, as illustrated by phantom lines in FIGURE 15, fluid communication between the wellhead 139 and the flowline is established by extending a jumper therebetween. This jumper takes the form of the aforementioned jumper tube assembly 143 and may be installed on the wellhead in the condition illustrated in FIGURES 16 and 16 either before or after the flowline 163 has been drawn into the tube 144. In the case where the jumper tube assembly is engaged on the wellhead before the flowline is drawn into the alignment tube, it is necessary to deflect the assembly to a position where it will not interfere with the pulling of the flowline into the alignment tube. Installation of the jumper tube assembly before engagement of the flowline in the alignment tube may be accomplished either prior to the time the wellhead 139 is installed in its submerged location, or after the wellhead has been so installed. In the latter case, the jumper tube assembly is lowered to the wellhead on a guide line in a manner corresponding substantially to that described with respect to the lowering of the aforedescribed jumper conduit 83. When the jumper tube assembly 143 is installed after the flowline 163 is engaged in the alignment tube 144, lowering of the mechanism is also accomplished in a manner corresponding substantially to the lowering of the jumper conduit 83.

Referring now to the detailed structure of the jumper tube assembly 143, this assembly basically comprises a Christmas tree 164 having a pair of jumper conduits 165 and 166 emerging therefrom in gently sweeping curves. The lower end of the Christmas tree is provided with a union adapted to be sealingly and releasably engaged on the upper end of the wellhead 139. Although not illustrated, this union may take substantially any form, such as that of the aforedescribed union 86. The latter type of union is particularly suitable, since it is adapted to be remotely operated by a manipulator. The ends of the jumper conduits 165 and 166 remote from the ends joined to the Christmas tree are received in carrier blocks 167 and 168, respectively, slidably received on the sides of the Christmas tree. The carrier blocks 167 and 168 are adapted to be deflected away from the sides of the Christmas tree, as illustrated by the phantom line representation of the block 167, in order that the jumper tube assembly will not interfere with the pulling of flowline into the alignment tubes. Extending forward from the carrier blocks 167 and 168 are a pair of conduits 169 and 172, respectively. The conduits 169 and 172 are established in fluid communication with the jumper conduits 165 and 166, respectively, through their respective carrier blocks and are of a length sufficient to span the distance between the blocks and the ends of flowlines received within the alignment tubes 144. Thus, the conduits 169 and 172 together with the carrier blocks 167 and 168 and the jumper conduits 165 and 166 function to establish fluid communication between flowlines engaged in the alignment tubes 144 and the interior of the wellhead 139.

Connection of the conduits 169 and 172 to the flowlines is facilitated by a pair of unions 173 and 174, respectively, located on the ends thereof in a position where they are adapted to be coupled to flowlines drawn through the alignment tubes 144, such as the flowline 163 illustrated in FIGURE 16. The unions 163 and 174 may take substantially any convenient form, but preferably should be adapted to be operated remotely through means of a manipulator, such as the aforediscussed manipulator 65. Unions corresponding to the aforedescribed union 86 or to the pin lock coupling of copending application Serial No. 72,064, filed November 28, 1960, now abandoned, are particularly well suited for this purpose.

To conclude, from the foregoing description it is believed apparent that the present invention provides novel and practical methods and aparatuses for remotely securing underwater flowlines in communication with submerged installations. The invention is not, however, intended to be limited to the specifically described and illustrated methods and aparatuses. For example, it is anticipated that J-shaped alignment tubes, such as that illustrated in FIGURE 1A could be clustered in groups of two or more on carrier members such as that illustrated in the embodiment of FIGURES 15 and 16. Furtheremore, situations may occur where it is desirable to position the alignment tube in such a manner that a flowline pulled into engagement therewith would be pulled directly into communication with the wellhead without necessitating the need for a separate jumper conduit. It is noted that the latter situation essentially occurs in the FIGURES 15 and 16 embodiment when the jumper tube assembly is secured to the wellhead prior to the engagement of a flowline in the alignment tube. Insofar as the installation of a jumper tube between the wellhead and the flowline received in the alignment tube is concerned, it is noted that this installation can conceivably be made either before or after the pulling of a flowline into the alignment tube, as was developed in the description of the FIGURES 15 and 16 embodiment. It is also anticipated that situations may occur where it is desirable to install either or both the alignment tube and jumper tube on the wellhead prior to the time it is installed in a submerged location. Accordingly, the present invention is intended to include various changes which may be made, within the scope of the apended claims, without departing from the spirit of the invention.

We claim as our invention:

1. A method of remotely connecting a flowline having a major portion adapted to lie along the floor of a body of water in fluid communication with an installation submerged in said body of water from a station located on the surface thereof, said method comprising:
   (a) providing the installation with an alignment element having an internal dimension slightly greater than the outside diameter of the flowline;
   (b) extending a drawline through the alignment tube;
   (c) securing one end of the drawline to the end of a flowline to be connected to the installation;
   (d) applying tension to the other end of the drawline to pull the flowline to and through the alignment tube; and
   (e) securing the end of the flowline extending through the alignment tube in fluid communication with the installation.

2. A method according to claim 1 wherein the installation is provided with the alignment tube by mounting said tube on the installation prior to the submerging thereof in the body of water.

3. A method according to claim 1 wherein the installation is provided with the alignment tube by lowering said alignment tube into secured engagement with the installation subsequent to the submerging thereof in the body of water.

4. A method according to claim 3 wherein the alignment tube is lowered into secured engagement with the installation by a series of steps, comprising:
   (a) connecting a guide line between the station and the submerged installation;
   (b) sliding the alignment tube along the guide line from the station to the installation; and,
   (c) locking the alignment tube to the installation.

5. A method according to claim 1 wherein the end of the flowline extending through the alignment tube is secured in fluid communication with the installation by extending a jumper conduit between the end of the flowline extending through the alignment tube and the installation.

6. A method according to claim 5 wherein the extending of the jumper conduit between the flowline and installation comprises:
   (a) connecting a guide line between the station and installation;
   (b) sliding a jumper conduit along the guide line from the station to the installation; and,
   (c) securing one end of the jumper conduit to the end of the flowline extending through the alignment tube and the other end of said conduit to the installation.

7. Apparatus to facilitate the remote joining of a flowline having a major portion adapted to lie along the floor of a body of water to an installation submerged in said body of water from a station located on the surface thereof, said apparatus comprising:
   (a) at least one guide element fixed to the installation;
   (b) a guide line extending between one end of the guide element and the station;
   (c) an alignment element having an internal dimension slightly larger than the external diameter of the flowline;
   (d) guide line receiving means fixed to the alignment tube, said means being adapted to slide along the guide line and into engagement with the guide element;
   (e) means disposed on the alignment tube to secure said tube to the installation; and,
   (f) means adapted to be operatively associated with the alignment tube to draw the flowline therethrough.

8. Apparatus according to claim 7 wherein the means adapted to be operatively associated with the alignment tube to draw the flowline therethrough comprises a flexible line extending through the tube, said line having one end secured to a source of tension and the other end adapted to be secured to the flowline.

9. Apparatus according to claim 7 including means on the alignment tube to fixedly secure a flowline drawn therethrough to the tube.

10. Apparatus according to claim 7 wherein the alignment tube comprises longitudinal and lateral segments associated to define a tube of substantially J-shaped configuration.

11. Apparatus according to claim 10 including means in the alignment tube to center the end of a flowline drawn therethrough in substantially aligned relationship with the longitudinal axis of the tube.

12. Apparatus according to claim 10 wherein upon engaging of the guide line receiving means on the guide element the alignment tube assumes a position with the longitudinal and lateral segments thereof extending in substantially vertical and horizontal directions, respectively.

13. Apparatus according to claim 12 wherein the lateral segment of the alignment tube is adapted to pivot with respect to the longitudinal segment about the axis thereof.

14. Apparatus according to claim 13 including:
   (a) means operatively associated with the installation and the alignment tube to fix the longitudinal segment of the tube relative to the installation upon engagement of the guide line receiving means on the guide element; and,
   (b) means operatively associated with the lateral segment of the alignment tube to selectively restrict pivotal movement between said segment and the longitudinal segment when the guide line receiving means is in engagement with the guide element.

15. Apparatus according to claim 13 including means on the installation to support the lateral segment of the alignment tube for pivotal movement with respect to the longitudinal segment.

References Cited by the Examiner

UNITED STATES PATENTS

| | | | |
|---|---|---|---|
| 2,669,209 | 2/1954 | Hoffman | 29—421 X |
| 2,869,226 | 1/1959 | Schurman | 29—321 |
| 2,946,560 | 7/1960 | Ferm | 285—304 X |
| 3,107,930 | 10/1963 | Gibbs et al. | 285—18 |
| 3,124,373 | 3/1964 | Thomsen | 285—18 |
| 3,129,030 | 4/1964 | Brockbank et al. | 294—66 |
| 3,130,999 | 4/1964 | Cannon | 294—66 |
| 3,132,416 | 5/1964 | Hait | 29—429 |
| 3,162,940 | 12/1964 | Kuhn | 29—421 |
| 3,179,443 | 4/1965 | Staffel | 285—61 |
| 3,194,590 | 7/1965 | Cook | 285—61 |

JOHN F. CAMPBELL, *Primary Examiner.*

THOMAS H. EAGER, *Examiner.*